Figures 1, 2, 3:
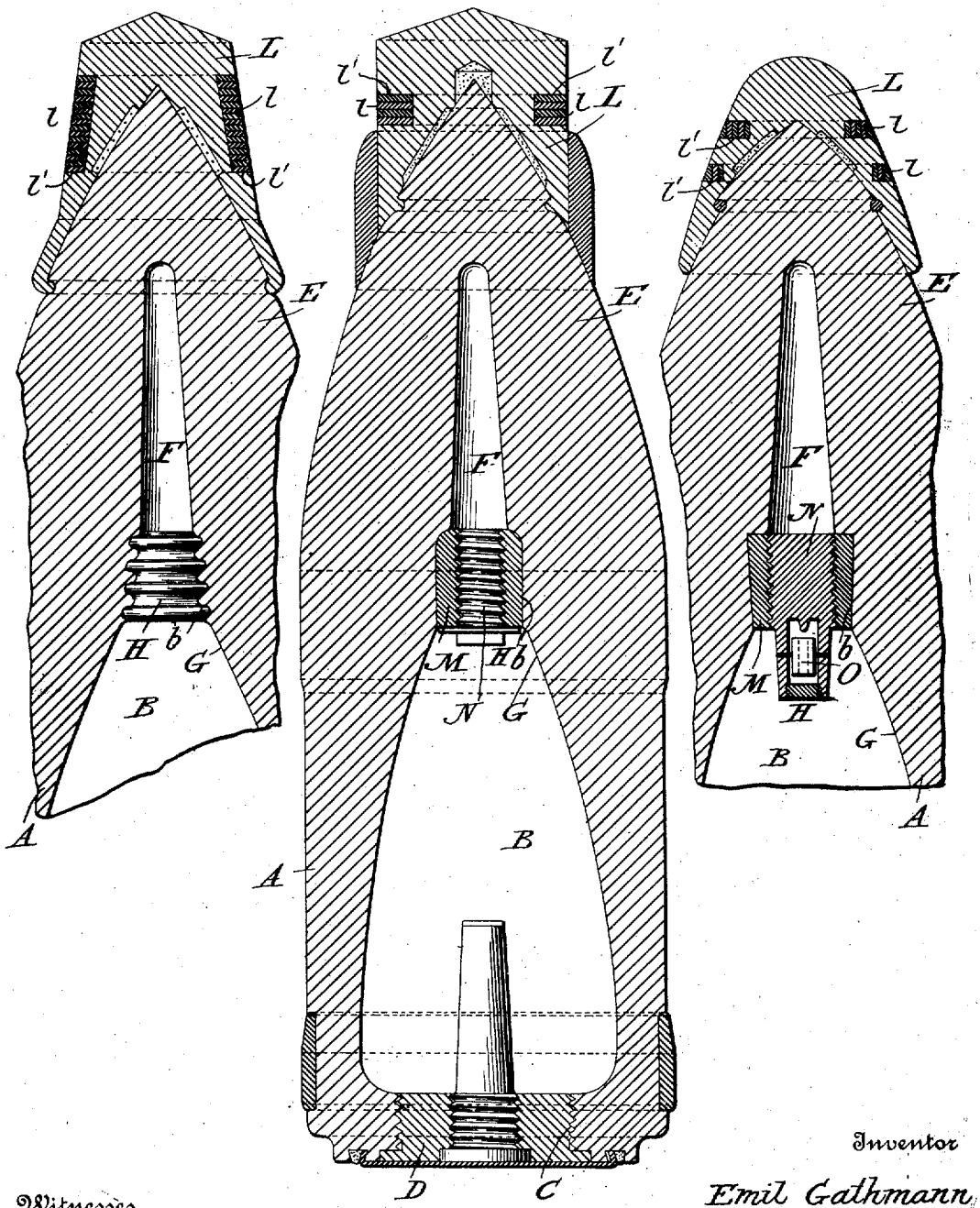

E. GATHMANN.

PROJECTILE.

APPLICATION FILED MAY 11, 1910.

Reissued July 12, 1910. 13,132.

Witnesses

Fanny P. Kingsworth

E. B. Franzoni.

Inventor

Emil Gathmann

By Baldwin & Wright his Attorneys

UNITED STATES PATENT OFFICE.

EMIL GATHMANN, OF BETHLEHEM, PENNSYLVANIA, ASSIGNOR TO GATHMANN ENGINEERING COMPANY, OF NEW YORK, N. Y., A CORPORATION OF MAINE.

PROJECTILE.

13,132. Specification of Reissued Letters Patent. Reissued July 12, 1910.

Original No. 922,573, dated May 25, 1909, Serial No. 420,396. Application for reissue filed May 11, 1910. Serial No. 560,753.

*To all whom it may concern:*

Be it known that I, EMIL GATHMANN, a citizen of the United States, residing at Bethlehem, Northampton county, State of Pennsylvania, have invented certain new and useful Improvements in Projectiles, of which the following is a specification.

The objects of this invention are to produce an armor piercing projectile containing for a given size or weight and mass of head a minimum of initial strains, bordering on rupture.

Other objects are to provide a construction which allows of uniform and efficient hardening and tempering of the large, as well as the small and medium sizes of armor piercing projectiles.

Further objects are to improve the details of construction of such projectiles.

My invention relates to that type of projectile termed armor piercing shot and shell by those familiar with the art. The head or forward portion of a projectile of this type is usually made very massive, and the body or rear portion contains a cavity or explosive charge chamber. It is extremely desirable that the head or forward portion of the projectile be so hardened and tempered as to enable the projectile when impacting with a suitable velocity to penetrate the extremely hard and tough armor plates produced by the Krupp and other systems. At the present date, specifications relating to armor piercing projectiles prescribe a test in which the projectile must perforate a hard faced armor plate equal to the Krupp standard of a thickness of at least one caliber or diameter of the projectile, with the requirements that there be no breaking or cracking of any portion of the latter so as to expose the charge cavity.

Although the armor piercing projectiles are at the present time being made of high grade alloy steels and are hardened and tempered with skill and care, a great many projectiles fail to pass the prescribed ballistic test. The most frequently occurring failures that I have personally witnessed during the past seven years were due to the shattering of the head of the shell and consequent exposure or opening of the forward end of the charge cavity. This danger of shattering or rupturing of the head of the projectile upon impact with modern armor plate becomes relatively greater, the larger the size or diameter of the projectile and the more massive the forward end or head.

From the many ballistic tests of projectiles that I have witnessed and from the number of experiments made, I have determined that the shattering and rupturing of the usual construction of armor piercing projectile head, is due mainly to the excessive initial strains in the mass of the metal composing the head, which strains are caused by the rapid necessary cooling during the hardening processes, and the consequent shrinkage of the large mass of the outer portion of the metal upon the practically unyielding inner axial solid core or central mass of metal, which being thus subjected to a compression beyond its normal shrinkage dimensions, exerts an initial outward pressure bordering on rupture. I have seen a great number of armor piercing projectiles, the points and heads of which have ruptured spontaneously within a short period of elapsed time after the hardening treatment.

In my improved projectile, I so construct the head portion that the internal rupturing strains due to the hardening treatment as previously described, will be much reduced or practically eliminated. In order to obtain a good bursting effect of the projectile due to the explosion of the cavity charge of explosive material, it is essential that the cavity be strongly inclosed and that no opening exist through which the gases would readily issue without properly fragmenting the shell.

Several forms of the invention are illustrated in the accompanying drawings, in which—

Figure 1 is a longitudinal central section of a projectile embodying the invention. Fig. 2 is a longitudinal central section of a portion of a shell embodying the invention. Fig. 3 is a longitudinal section showing a modified form of barrier seat.

Similar letters represent like parts throughout the drawings.

The practically cylindrical body A of the projectile contains a charge chamber B provided at its rear end with a threaded portion C adapted to engage with a suitable base plug D. The relatively massive head E is provided with a centrally located longitudinal bore F, said bore extending from the forward end G of the charge chamber B into the massive head portion E, a barrier block H being provided to separate the charge chamber B from the bore F.

The barrier H is suitably secured at or near the forward end of the charge chamber B, where a seat *b* is located, and may be built up as shown by a bushing M and a plug N in Fig. 1, and the said barrier may be adapted to carry a shell fuse O if so desired, as shown in Fig. 3.

A cap L of any desired form is preferably placed over the point of the projectile the cap being locked to the head of the projectile in any of the usual manners, several types of caps and methods of fastening being shown in the various figures. When the head and the point of the projectile are not formed by the same radius, but consist of two or more radii, I prefer to employ a cap having its exposed or outer body portion formed of a contour approximately similar to the contour of the radius or curve forming the head of the projectile, as shown in Fig. 3 of the drawings. The splitting resistance of the soft cap I have found may be advantageously increased by reinforcing its body by means of coils of wire or by stiffening collars as shown in the various figures of the drawing.

The reinforcing means just referred to is indicated by *l* in Figs. 1, 2 and 3. These coils of wire or stiffening collars *l*, as shown in the drawings, are seated in annular grooves or recesses *l'* surrounding the cap L between its inner and outer ends and in a plane crossing the outer pointed end of the projectile. These coils or collars increase the splitting resistance of the cap. It is well known that caps of this kind are instantly deformed upon impact with the hard face of an armor plate. The reinforcing means just described retards this deformation. When the plate is dished or depressed and the soft metal cap has been deformed and the point of the projectile enters the hard face of the armor plate, penetration of the projectile is more easily accomplished. The reinforcing means causes the cap to shatter or break with greater uniformity and thus a uniform dish in the armor is produced to receive the pointed end of the projectile and thus the projectile is made to enter the armor plate with greater accuracy.

In Fig. 1 the cap L is shown as being provided with a recess P. This is for the purpose of preventing sidewise or irregular breaking of the cap which would tend to make a projectile enter the cap at an angle and therefore enter the armor plate at an angle. If the cap were first shattered on one side, the reinforcing means would hold the shattered side within itself, *i. e.*, the collars or coils of wire would confine the parts of the shattered cap long enough to form a guide for the projectile which would pass through the central bore of the soft metal cap and spread all parts thereof uniformly.

In hardening the head E of my construction of projectile, the mass of metal will contract inwardly in the usual manner due to rapid cooling of the same; the bore F will however allow of an inward movement or flow of the metal as the natural decrease in the volume of the head takes place, thus initial strains such as obtained in a solid headed projectile will not occur, as the bore F provides for an inward flow on displacement of metal, while heated and plastic, which in the solid headed projectile is impossible as the pressure on the interior solid portion caused by contraction of the outer portion results in a reactionary pressure tending to disrupt the said outer portion.

It is evident, the larger the projectile the more pronounced this action, as the cooling is necessarily slower with increased diameters, the surface increasing in direct ratio to the diameter, while the volume of metal increases as the square of the diameter. I would therefore vary the diameter of the shrinkage bore F and also its depth to suit the caliber of the projectile or the mass of metal in the head of same, thus allowing for increased changes of volume.

If, in the hardening treatment, cooling from the exterior only is desired, which method I prefer, the bore F is plugged with a suitable material such as fire clay, asbestos or the like so that the cooling medium will not act on the same directly.

It will be evident that my invention may be embodied in other forms than those illustrated.

Therefore, without limiting myself to the precise construction illustrated and described, I claim:—

1. An armor piercing projectile, comprising a body bearing a tapering head and non-apertured point both formed integral therewith, a charge chamber within the body, an axial bore within the tapered head portion and a seat for a plug located between the said bore and the charge chamber.

2. An armor piercing projectile, comprising a body bearing a tapering head and non-apertured point both formed integral therewith, a charge chamber within the body, a reduced bore within the tapered head portion and a plug secured between the said charge chamber and the bore.

3. An armor piercing projectile, comprising a body bearing a tapering head and non-apertured point both formed integral therewith, a charge chamber within the body, a reduced bore within the tapered portion of the head and an inserted barrier separating the bore from said chamber.

4. An armor piercing projectile, comprising a body bearing a conical head and non-apertured point both formed integral therewith, a charge cavity within the body, a reduced bore within the conical portion of the head and a threaded seat for a plug located between the bore and the said charge cavity.

5. A projectile having formed in one piece its body, tapered head and point, a conical shaped cavity within the body, a smaller cavity within the tapered head and a seat adapted to engage a barrier plug located between the said cavities.

6. An armor piercing projectile having formed in one piece its body, tapering head and point, a charge cavity in the body, a cavity of smaller diameter within the tapering head and a barrier interposed between said cavities, in combination with a soft metal cap mounted on the point of said projectile.

7. A projectile having formed in one piece its body, tapering head and point, a charge cavity in the body, a smaller cavity within the tapering head and a seat adapted to engage a barrier located between the said cavities, in combination with a soft metal cap mounted on the point of said projectile.

8. A projectile having formed in one piece its body, tapered head and point, the outer contour of the said head and point being formed by compound curved lines, a charge cavity within the body and a smaller cavity within the tapered head and a seat adapted to engage a barrier plug located between said cavities.

9. A projectile having formed in one piece its body, tapered head and point, the outer contour of the said head and point being formed by compound curved lines, a charge chamber within the body and a smaller chamber within the tapered head, a seat adapted to engage a barrier plug located between said chambers, in combination with a metal cap mounted upon the point of said projectile.

10. A projectile having formed in one piece its body, tapered head and point, the outer contour of said head and point being formed by compound curved lines, a charge chamber within the body and a smaller chamber located in the tapered head and a barrier plug located between said chambers for the purpose set forth.

11. A projectile, comprising a body portion bearing a hardened head and point, and a metal cap mounted upon the said point, the said cap having a circumferential reinforcement in a plane cutting the forward end of the projectile.

12. A projectile, comprising a body portion bearing a hardened tapered head and point and wherein the head is formed by two or more radii, a relatively soft metal cap mounted on and locked to said point and having an outer contour formed by radii approximately similar to the radii forming the head of the projectile, and reinforcing means surrounding the front portion of the soft metal cap.

13. A projectile, comprising a body portion bearing a hardened head and point, a tapered metal cap mounted upon said point, and reinforcing means interposed wholly between the inner and outer ends of the cap and surrounding it in a plane cutting the forward end of the projectile.

14. A projectile, comprising a body portion bearing a hardened head and point, a metal cap mounted upon the said point and reinforcing means interposed wholly between the inner and outer ends of the cap and surrounding it in a plane cutting the pointed end of the projectile.

15. A projectile, comprising a body portion bearing a hardened tapered head and point, a metal cap mounted upon the said point and formed with an annular groove around its middle portion between its front and rear ends, and a reinforcing collar arranged in said groove.

16. A projectile, comprising a body portion bearing a hardened tapered head and point, a relatively soft metal cap mounted on and locked to said point and which is reduced in diameter at its forward portion, and a collar seated in the said reduced diameter of the forward portion of the cap and having its outer surface approximately flush with the outer surface thereof.

17. A projectile, provided with a relatively soft metal cap shaped also to form a contour cap and having reinforcing means applied thereto in a plane cutting the forward end of the projectile.

18. A projectile, provided with a tapered cap of relatively soft metal having its contour designed to reduce the resistance of air during the trajectory of the projectile and which is provided with a circumferential reinforcement in a plane cutting the forward end of the projectile.

19. A projectile, comprising a tapered body portion, a soft metal cap applied thereto having a central bore or recess in front of the point of the projectile, and reinforcing means surrounding the cap in a plane cutting the forward end of the projectile.

20. A projectile, comprising a tapered body portion, and a relatively soft metal cap applied thereto having a central recess or opening in front of the point of the projectile, the said cap having a circumferential reinforcement in a plane cutting the forward end of the projectile.

21. A projectile, comprising a tapered body portion, a relatively soft metal cap applied thereto having a central recess or opening in front of the point of the projectile and having an annular groove surrounding it arranged wholly in rear of the front portion of the cap in a plane cutting the forward end of the projectile, and reinforcing means arranged in said groove and surrounding the cap.

22. A projectile provided with a relatively soft metal cap shaped to form a contour cap and a reinforce firmly secured to the forward portion of said cap but not integral therewith.

23. A projectile, comprising a body portion having a hardened tapered head and point, the outer contour of said head and point being formed by compound curved lines, and a relatively soft metal cap mounted upon said point, the outer contour of said cap being approximately similar to the outer contour forming the head of the projectile, and a circular reinforcement surrounding the said cap in a plane cutting the forward end of the projectile.

24. A projectile, comprising a hardened tapered body portion, and a cap of relatively soft material applied thereto having a central bore or recess in front of the point of the projectile, the said cap being reinforced at that portion thereof lying approximately equidistant between its front and rear ends.

25. A projectile, comprising a hardened tapered body portion, and a relatively soft metal cap which has a chamber in front of the projectile point, the said cap being solid and substantially massive in front of said chamber and being reinforced approximately midway between its front and rear ends.

26. A projectile, comprising a body portion bearing a tapered head and point, a tapered cap having a chamber in front of the projectile point and mounted upon the said point, the said cap being reduced in diameter at its forward portion, and an annular collar seated on the said reduced portion and having its outer surface approximately flush with the outer surface of the cap proper whereby the contour of the tapered cap is unmodified and is designed to reduce the resistance of the air during the flight of the projectile.

27. A projectile, comprising a body portion bearing a hardened tapered head and point, and a cap of relatively soft material applied thereto having approximately the same general outer contour of the outer and exposed portion of the head of the said projectile, the said cap being provided with a chamber in front of the forward portion of the said projectile, and being reinforced approximately midway between its front and rear ends.

In testimony whereof I have hereunto subscribed my name.

EMIL GATHMANN.

Witnesses:
ISABEL GATHMANN,
VICTORIA GATHMANN.